United States Patent
Armit

(10) Patent No.: US 8,807,491 B2
(45) Date of Patent: Aug. 19, 2014

(54) PIPING SYSTEM

(76) Inventor: Cedric Brian Anthony Armit, Red Beach (NZ)

( * ) Notice: Subject to any disclaimer, the term of this patent is extended or adjusted under 35 U.S.C. 154(b) by 318 days.

(21) Appl. No.: 12/604,647

(22) Filed: Oct. 23, 2009

(65) Prior Publication Data

US 2011/0095140 A1   Apr. 28, 2011

(51) Int. Cl.
*F16L 3/00* (2006.01)

(52) U.S. Cl.
USPC .......................................... 248/68.1; 248/906

(58) Field of Classification Search
USPC ................... 248/68.1, 65, 74.1, 74.4, 49, 906
See application file for complete search history.

(56) References Cited

U.S. PATENT DOCUMENTS

| | | | |
|---|---|---|---|
| 3,526,934 A * | 9/1970 | Owen, Sr. .................. | 285/154.1 |
| 3,872,894 A | 3/1975 | Streit | |
| 4,201,433 A * | 5/1980 | Caldwell ......................... | 439/98 |
| 4,630,847 A | 12/1986 | Blenkush | |
| 5,463,187 A | 10/1995 | Battle | |
| 5,533,637 A * | 7/1996 | Williams, Jr. .................. | 220/3.8 |
| 5,791,607 A * | 8/1998 | Thibault et al. ................. | 248/58 |
| 6,513,765 B2 * | 2/2003 | Griffin et al. ................ | 248/68.1 |
| 6,561,466 B1 * | 5/2003 | Myers et al. ................. | 248/74.4 |
| 6,890,191 B1 * | 5/2005 | Thorburn ......................... | 439/98 |
| 6,902,138 B2 * | 6/2005 | Vantouroux ................. | 248/68.1 |
| 7,408,112 B1 * | 8/2008 | Wimberly ........................ | 174/66 |
| 8,022,320 B2 * | 9/2011 | Matsumoto et al. ........ | 200/51 R |
| 2002/0063194 A1 * | 5/2002 | O'malley ................. | 248/346.02 |

* cited by examiner

*Primary Examiner* — Steven Marsh

(74) *Attorney, Agent, or Firm* — Young & Thompson

(57) ABSTRACT

The invention consists in a system for placement of conduits to a property site comprising a conduit receiving channel member which is shaped to receive a selected plurality of conduits. The channel member has one or more access points adapted to enable access to a portion of the channel member. The arrangement enables easy detection of service pipes to and from a property site. Preferably the/or each access point is in the form of a box. The invention further includes within its scope a structure fitted with or otherwise connected to such a system.

16 Claims, 8 Drawing Sheets

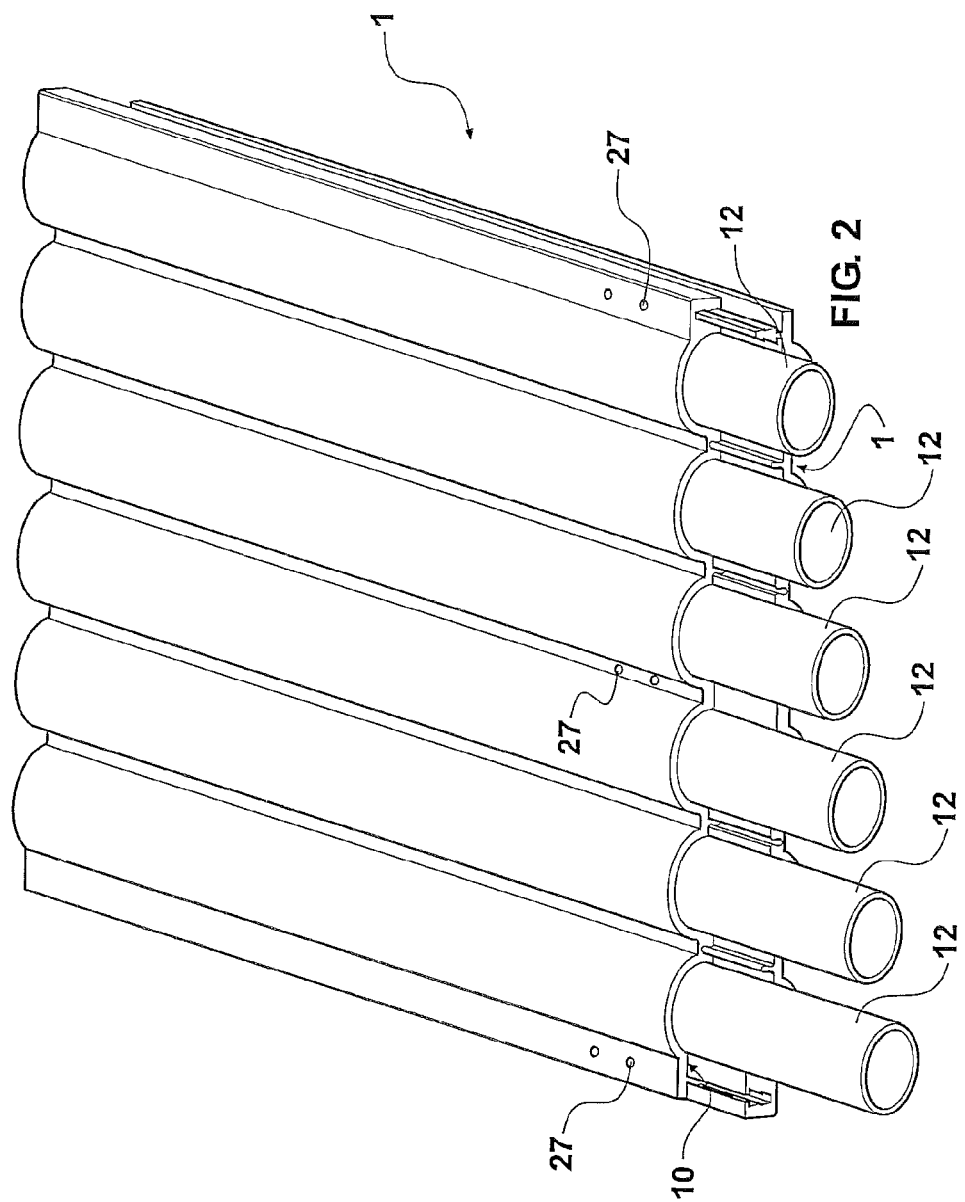

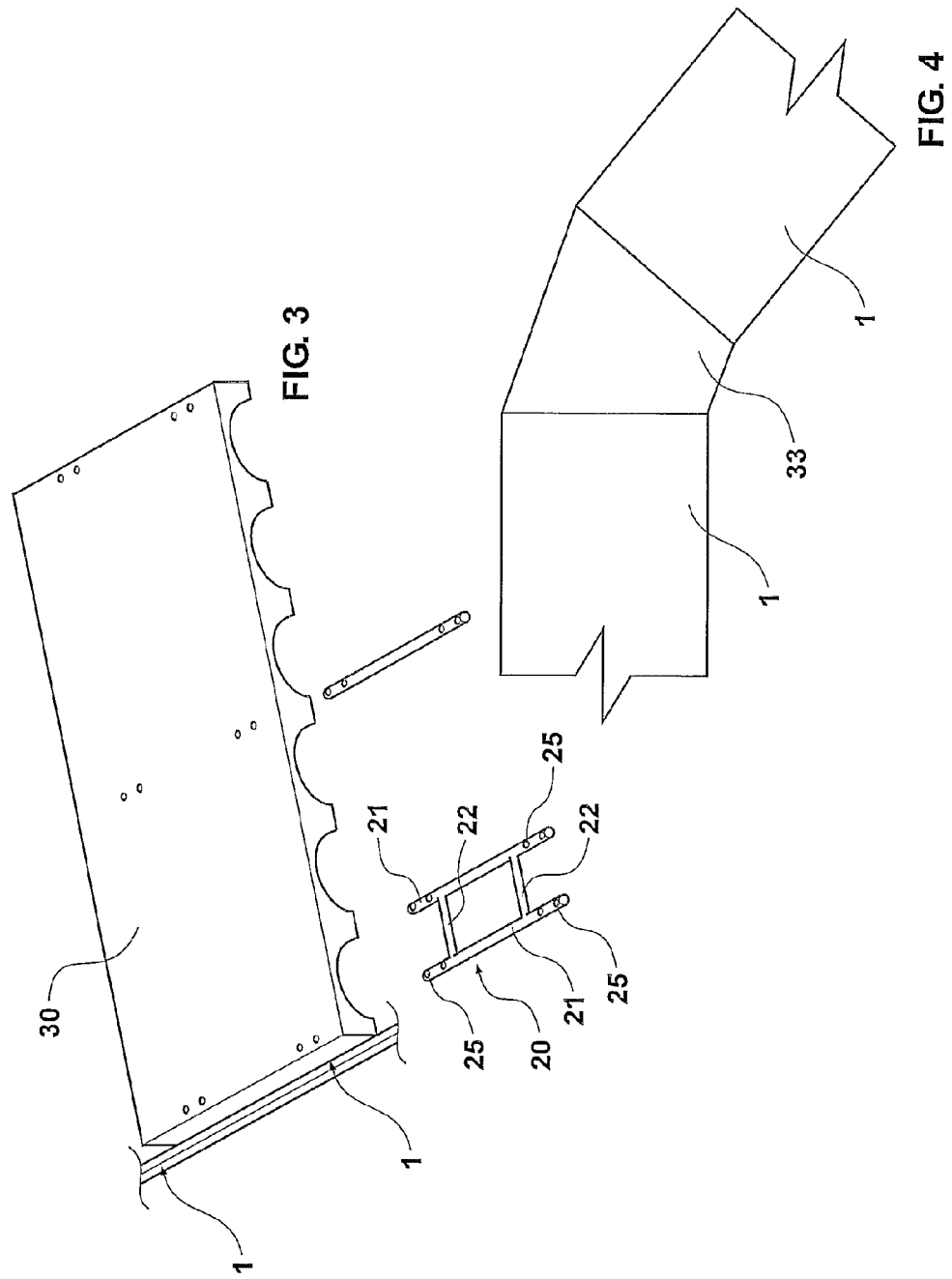

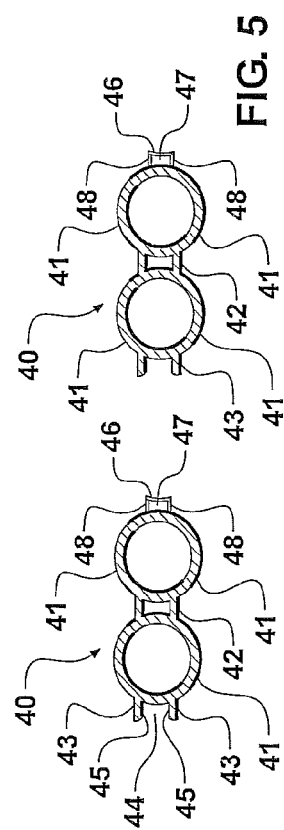

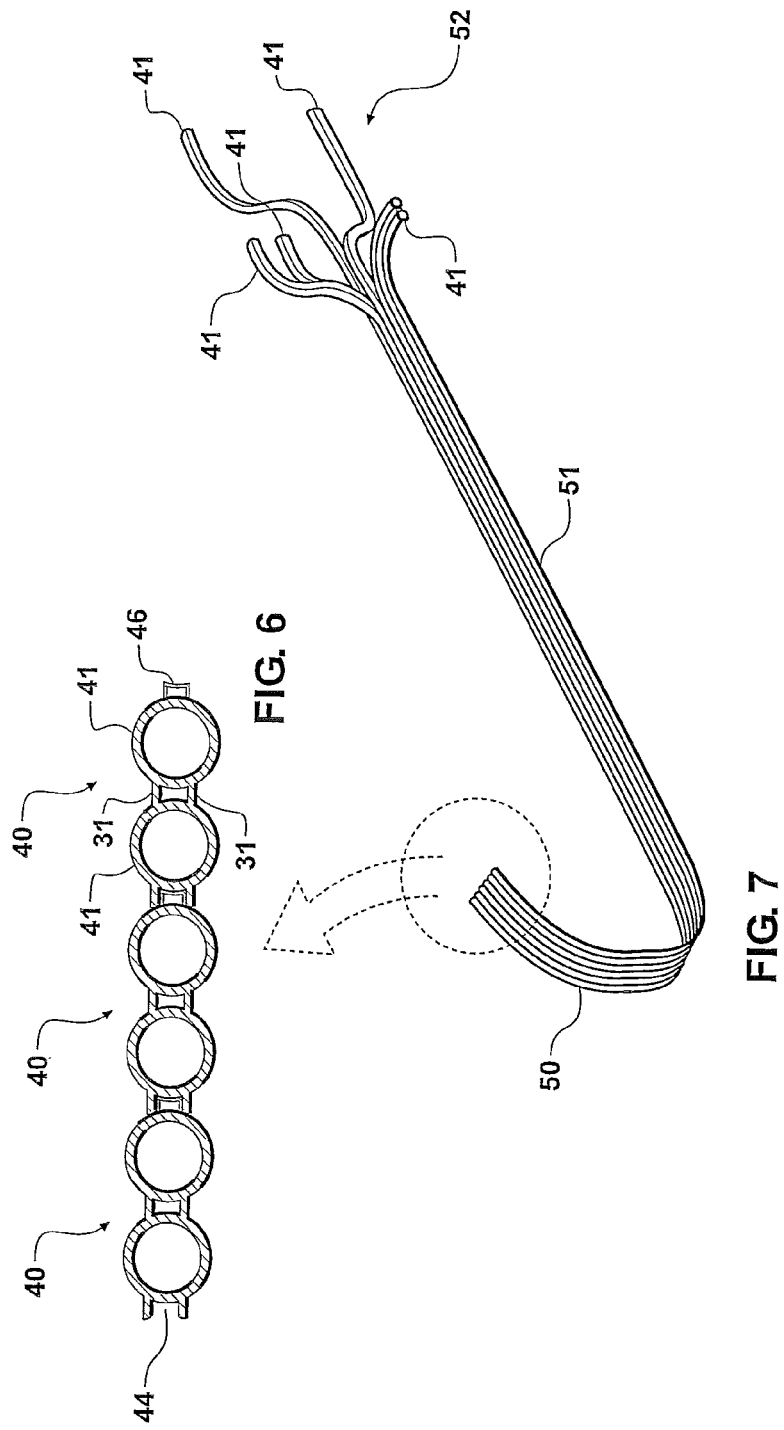

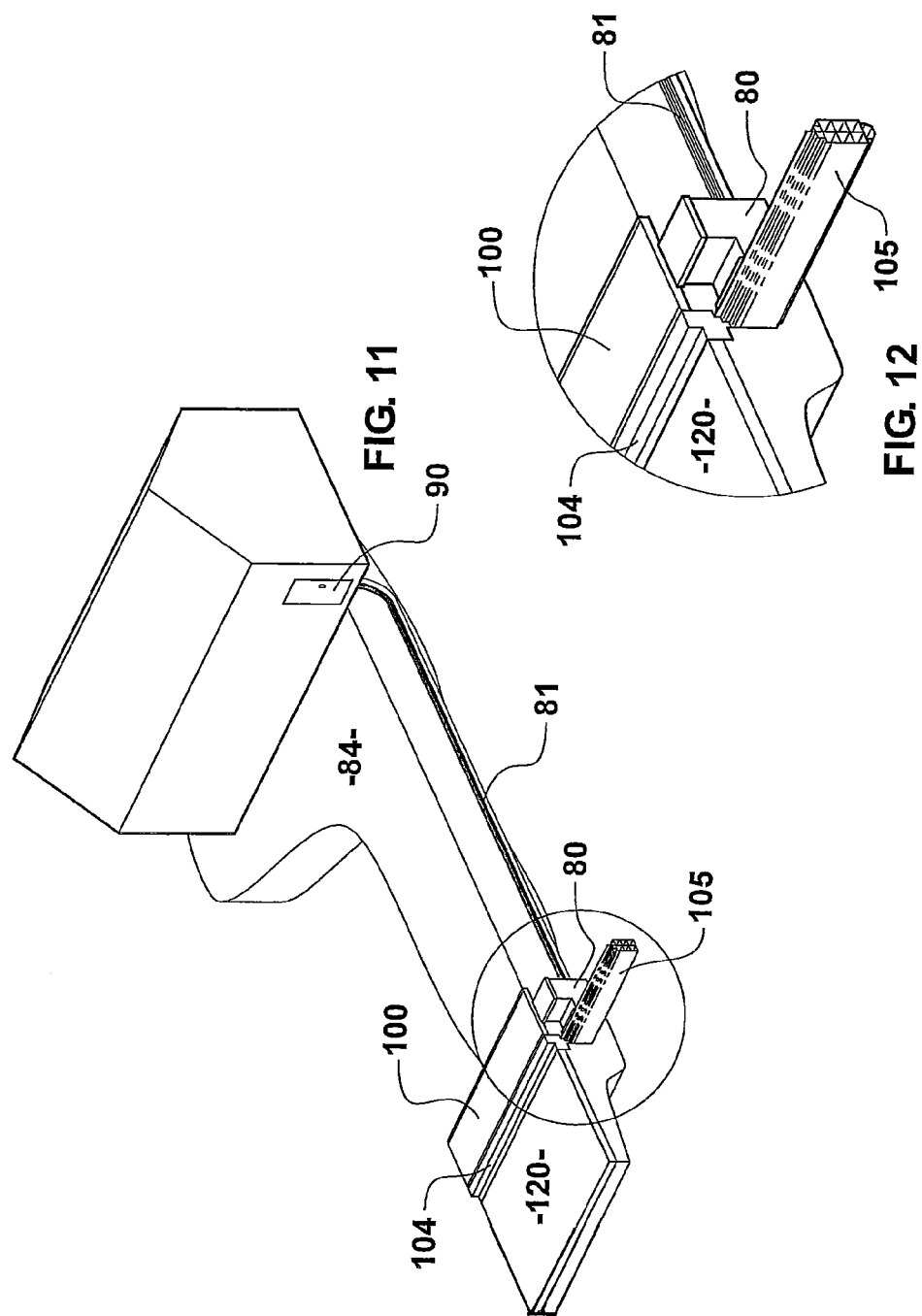

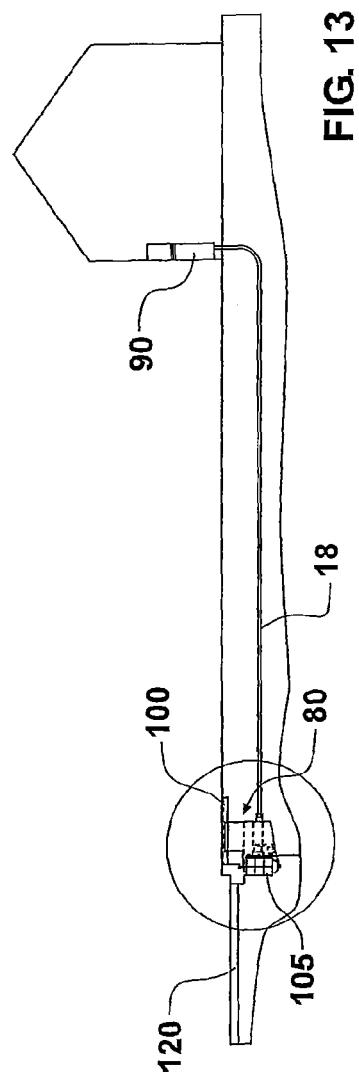
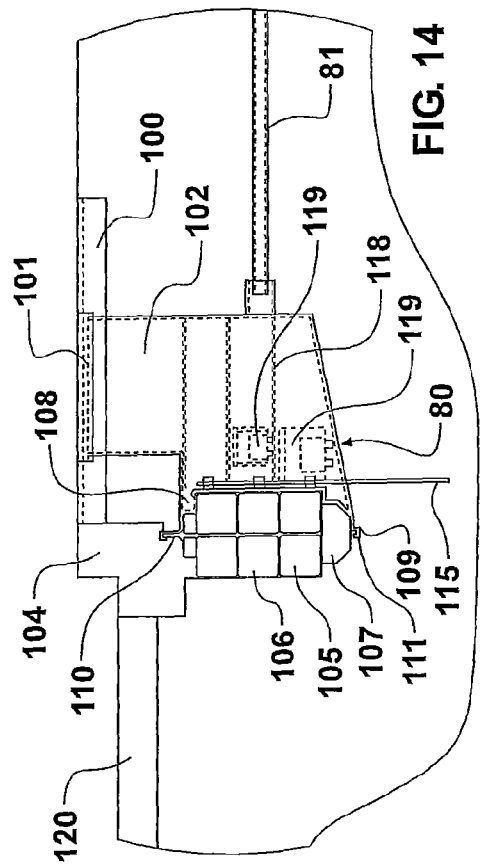

PIPING SYSTEM

FIELD OF THE INVENTION

The present invention relates to a system of cabling and conduits along with means to provide ease of access to the cabling, in particular but not exclusively to cabling used by service providers to provide services to buildings or structures (both temporary or permanent) such as domestic properties, offices, stadia, wharves, concerts and the like.

BACKGROUND ART KNOWN TO THE APPLICANT

The placement of various types of cables and conduits (hereinafter called "conduits") for example those of service providers, such as phone, gas, water and power, is traditionally effected by each service provider independently digging at different, and sometimes the same, locations on a property site so that each service provider may place their independent service conduits.

It is usually difficult to schedule all service providers to place their conduits at a property site on the same day, or over a relatively short period, and as conduits cannot be left exposed and unattended on a property site, the effect of this is that areas of a property site are repeatedly dug by each successive service provider when laying their respective conduits.

Due to the time and effort expended by each service provider in independently digging and laying their conduits at a respective site, the customer experiences delays in receiving provider services and added expense due to the cumulative work required to be performed by each provider in preparing the site for the laying of their conduits.

Furthermore, access points to the various conduits for the purposes of 'servicing' or indeed to 'cut someone off' for (for example) non payment of the service provider's invoice also tend to be scattered around the structure that is being provided with the service.

OBJECT OF THE INVENTION

It is an object of the present invention to provide a system for ease of placement of service provider's conduits at a property site, together with the provision of one or more access points for the conduits and or at least to provide the public with a useful choice. It is intended that the description and drawings of NZ 536486 are imported into this specification.

STATEMENT OF THE INVENTION

Accordingly the invention consists in a system for placement of conduits to a property site comprising a conduit receiving channel member shaped to receive a selected plurality of conduits, and one or more access points adapted to enable access to a portion of the conduit receiving channel member.

Such an arrangement enables easy detection of service pipes to and from a property site.

This is because although using detection equipment it is normally easy to locate underground gas, electric and telephone pipes/cables running to and from a property or structure, water pipes are notoriously difficult to detect and are usually found once a digger has destroyed them by accident. If all of the pipes/cables were located together, then this problem would not occur.

Furthermore, if more than one access point is used, then, in respect of a gas pipe where the mains pressure is far higher than the pressure used in a property or structure a conventional regulator incorporating a gas meter (wherever it is installed within the property or structure) to 'step down' the pressure to a more usable level need not be used. Instead, a regulator unit and a meter reading unit which individually can be much smaller, may be used if one is fitted at one access point and the other is fitted at another access point.

Water pipes on the other hand, do not tend to require any such regulator however, should a back flow regulator or limiting valve/filter be required the system will allow for its provision. In addition although electrical cabling may require a regulator in the form of an electrical booster to 'step up' the supply (if for example the property or structure is to be provided with or capable of using multiple television sets). As such, the booster can be located at the or each access point.

With the advent of modem technology, satellite dishes for TV reception for example, could in the not too distant future be reduced in size to the point where they too could be fitted to an access point.

Therefore, preferably the system is provided with one or more 'mains to property or structure' regulators accessible via at least one access point.

Such an arrangement has the advantage that not only could all regulators be accessed from the same point, but in the example of a gas pipe given above the size of the unit can be reduced as the meter and the regulator can now be separate items, one located at an access point of the system and the other located in the property or structure.

Preferably, there are two access points. If one of the access points houses each of the meters e.g. gas, water, electric together with taps to turn each of them off then, new occupants to the property or dwelling will know immediately where to go to turn off or read the necessary appliance/meter.

In addition, with more than one access point conventional back flow prevention measures can be installed at the or each access point. The larger number of access points also enables a greater number of devices to be fitted in series (at the access points) that are associated with each service. For example, one access point could incorporate a replaceable water filtration device and another access point would enable a water sterilisation device (e.g. UV light based) to be fitted effectively in series with the water filtration device.

More preferably, at least one access point is remote from the structure. This has the advantage that servicing work of the system, for example, can be carried out without the need to step onto the property of an owner being supplied with the services.

Furthermore, (again using the gas supply as an example) if the gas supply can be turned off from an access point at ground level remote from the structure (instead of adjacent to it), then, in the event of a natural catastrophe such as forest fire, there is little to no chance of a gas shut off tap melting or being damaged to the point where the gas is free to escape causing a "flame thrower" effect to take place (as has been the case in Australia on occasion during such fires, thus destroying the properties in question).

Solenoids employed for gas shut down the line could thus be fitted at access points remote from the structure and if pulse meters were installed, services could also be read remote from the structure.

More preferably still, at least one access point is located on or adjacent the exterior of the structure.

Preferably one of the access points is located at or below ground level.

Preferably, the or each access point is sufficiently protected against ingress from the elements and living organisms. Water and creatures from the class known as insecta can flow in either direction if there is a leak or existing pipe work for them to travel along respectively. In terms of the latter, means could be provided to prevent living organism movement along or through the system.

Such means will be known to the person skilled in the art and as a result need not be discussed further in this specification.

Preferably the or each access point is in the form of a box.

The box could be formed from metal, metal alloys, plastics material or any appropriate selection or combination of the above materials.

The invention includes within its scope a system substantially as herein described with reference to and/or as illustrated in any appropriate selection or combination of the accompanying drawings.

The invention further includes within its scope a structure fitted with or otherwise connected to such a system.

BRIEF DESCRIPTION OF THE DRAWINGS

A preferred embodiment of the present invention will be now described, by way of example only, with reference to the accompanying drawings in which:

FIG. 2 is a diagrammatic perspective view of a receiving system comprising channels formed from co-operation of male and female members located on the elongated depressions according to part of a preferred form of the invention, FIG. 3 is a diagrammatic perspective view of a connection member with securing means for use in a receiving system according to a preferred embodiment of the invention, FIG. 4 is a diagrammatic plan view of a receiving system showing a bend for a preferred embodiment of the invention, FIG. 5 is an end view of an alternative preferred form of part of the invention, FIG. 6 is an end view showing a plurality of receiving systems according to FIG. 5 in interconnected form, FIG. 7 is an enlarged perspective view of the receiving system of FIGS. 5 and 6, FIG. 8 includes an isometric view of a kerb side services box operatively linked to the rest of the system, FIG. 11 is an isometric view of an alternative construction, FIG. 12 is an enlargement of "A" in FIG. 11, FIG. 13 is an end elevation of the construction in FIG. 11, and FIG. 14 is an enlargement of "B" in FIG. 13.

DESCRIPTION OF THE PREFERRED EMBODIMENT

Figure 1:
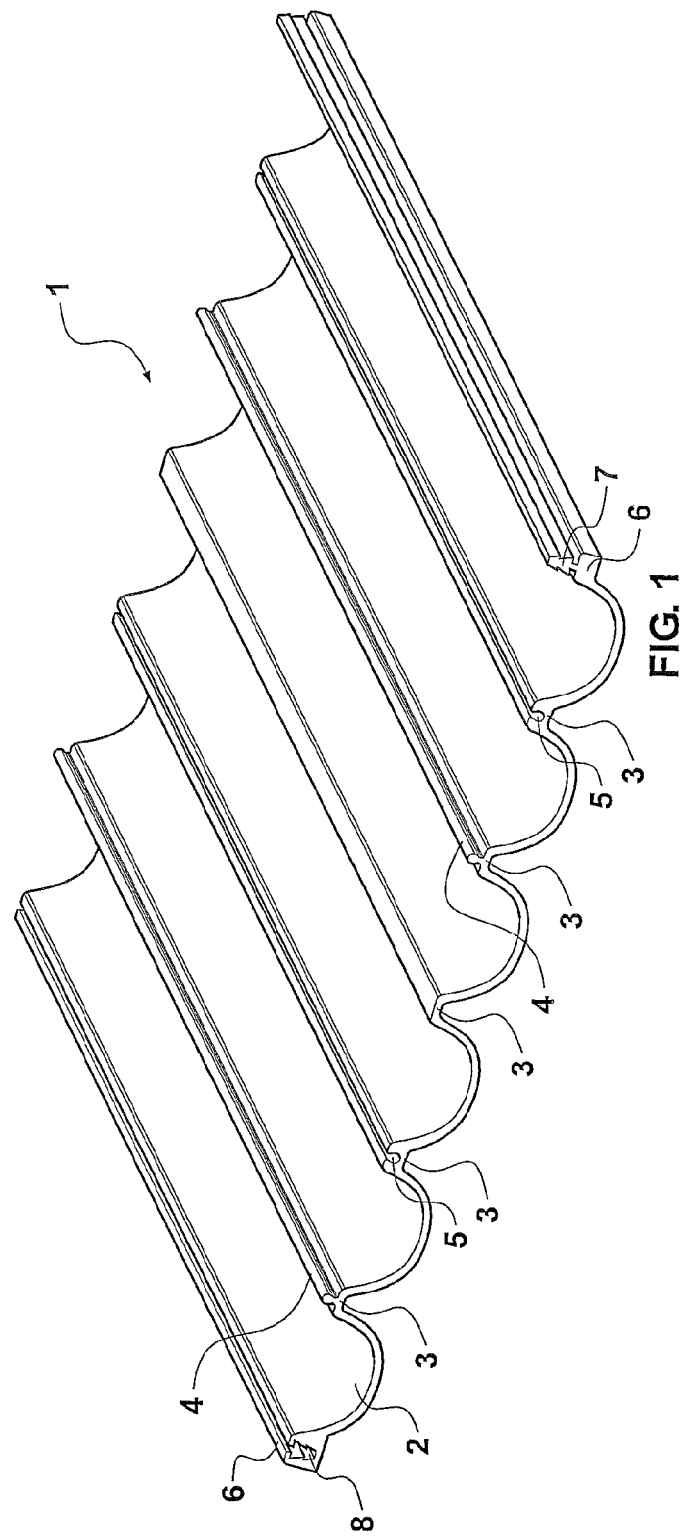
FIG. 1 is a diagrammatic perspective view of a plate for a receiving system showing a plurality of elongated depressions according to a preferred form of part of the invention.

A receiving system for conduits is provided which in the first preferred form comprise an elongated plate 1. The plate 1 shown in FIG. 1 is shortened for the purposes of clarity. The plate 1 is provided with a plurality, such as six, elongated depressions 2 thereacross. The plate 1 is desirably moulded as a single unit from a suitable plastics material such as polyvinyl chloride.

The ridge 3 between the channels 2 may carry either a bulbous rib 4 or a narrow mouthed channel 5 into which the rib 4 is a snap fit. The central ridge 3 in the embodiment in FIG. 1 carries neither.

Side flat areas 6 again may each carry either a co-operating rib 7 or a channel 8 which are a snap fit together. In the embodiment of FIG. 1 a "Christmas tree" shaped rib and channel are shown. Plates 1 can then be snapped together as seen in FIG. 2 to form channels 10 between the two plates 1. Intermediate ribs are connected together, save for the centre ribs 3. The "Christmas tree" construction provides additional connection between the side ridges.

The dimensions of the channels 2 formed by co-operation of male 4, 7 and female 5, 6 attachment members are determined by the diameter of conduits 12 which are to be positioned in use in the channels 2.

A connection member 20 is preferably provided for the system so that plates 1 placed end to end may be connected. The connection member may comprise two substantially parallel stringers 21 connected by cross members 22.

The connection member 20 is provided with securing means preferably in form of apertures 25 through which bolts (not shown) or the like may pass allowing the connection member 6 to engage with the plate 1. To enable this, the plates 1 may have corresponding apertures 27 at, for example, the edges and centre thereof. The connection member therefore holds two receiving plates 1 together end to end.

If desired a connection plate 30 can span two receiving system plate pairs. This enables a good connection between the plate pairs to be made. In FIG. 4 a horizontal turn connector 33 is provided. Vertical turn connectors and connection of other radii can also be provided. In use a service provider's conduit 12 may be feed through a channel 10 in the plates 1, as shown in FIG. 2.

The combination of the integers results thus far in a system for placement of conduits comprising a receiving means, optional attachment means, and clamping means as illustrated in FIG. 3.

Referring now to FIG. 5 conduits 40 are provided which may be extruded from, for example, a suitable plastics material. The construction of FIG. 5 shows two conduits 40 therein. Thus in this embodiment the conduits 40 are extruded in pairs. It will be apparent of course that a set of conduits 40 could be extruded to provide a single conduit or a number of conduits greater than two up to a suitable practical limit such as, for example, six conduits. However, pairs of conduits 40 are the preferred form.

The pair of conduits 40 are linked by bridging parts 31 and connection means are provided to allow the pairs of conduits 40 to be connected in a side by side relationship. In the preferred form the connection means are provided by a pair of spaced apart outwardly extending flanges 43 to form a channel 44. The mouth of the channel is narrowed by inwardly extending ribs 34 which are desirably shaped to provide a snap fit as will be described further hereinafter.

A protrusion 35 is provided opposite the ribs 32 and in the embodiment describe the protrusion is hollow having an interior 36. The width of the protrusion 35 is such that the protrusion is able to be a snug fit into the space 33 of an adjacent set of conduits 40 as can be seen from FIG. 6.

In the preferred form towards the base of the protrusion 35 are provided inwardly extending longitudinal channels 37 into which a rib 34 may pass.

The plastics or other material from which the conduit pairs are formed are preferably such that there is sufficient flexibility in the material to enable the arrangement to be performed and also, by reference to FIG. 7, an elongated strip of material is shown which is sufficiently flexible to be able to be formed into curves such as that shown at 41.

As an alternative shape members may be provided which are able to be connected to the part 40.

As can be seen at end 42 of the member 40 the conduit pairs may be left unconnected or may be separated, for example, by cutting along bridges 31 so the ends of the conduits 40 may be manipulated into any suitable position. Thus the conduits have substantially parallel longitudinal axes over at least a substantial part of the length of the conduits.

By providing a further part engagement means sets of conduits could be built into blocks of conduits if desired.

Figure 10:
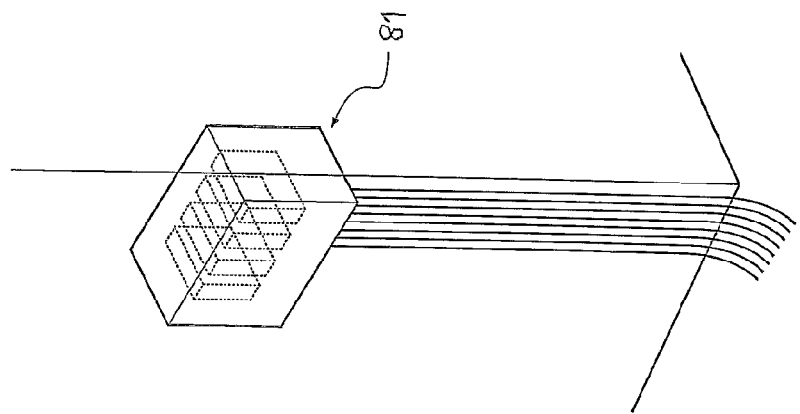
FIG. 10 is an isometric view of a house end service box.
Figure 9:
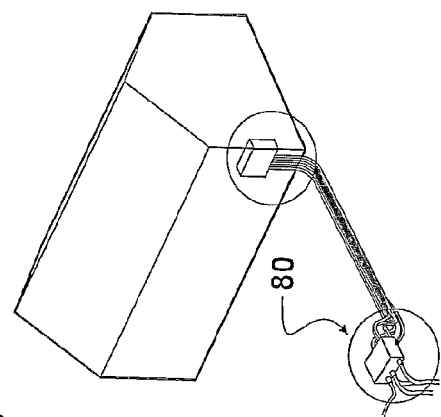
FIG. 9 is an isometric view of a pair of service boxes and a dwelling.
Figure 8:
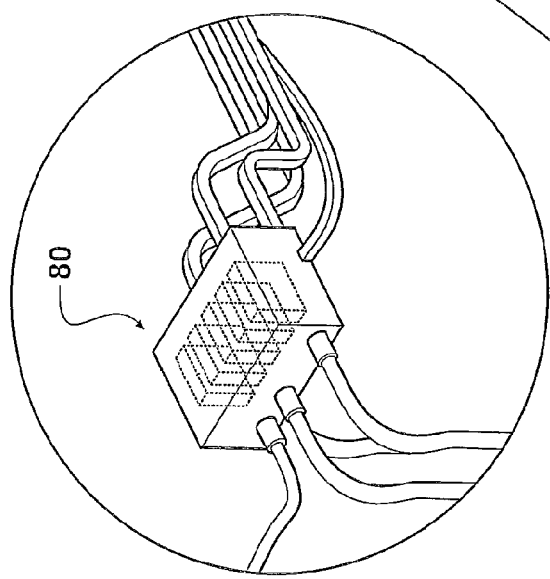

FIGS. 8 to 10 show a kerb side services box that is generally referenced 80. Fitted at ground level the hermetically sealable box 80 is connected directly to a number of services such as mains supply gas, phone, electricity etc. It is also provided with a plurality of quick connect points to enable complimentary ends of the conduits 81 (as already described) on the "house" side of the box 80 to be connected up to the mains supply (or national or telephone grid) via box 80. Services in conduits 82 can be from the "grid" side connected to box 80. Box 80 contains suitable connection conduits 83.

The remote location of the box 80 relative to the property 84 means that access to the box 80 by a service repair man is possible without walking onto the property 84 or the land associated with it. Box 80 may also contain a regulator for the gas mains to enable the mains pressure to be stepped down.

FIG. 10 shows another box 90, (a house end service box) again fitted with a number of quick connect points at 91 which respective complimentary ends of the conduits 81 can connect to. Box 90 may also contain the meter for the gas and the electricity and the water enabling all of these to be read by an individual or meter reader without the need for access into the interior of property 84 as the box 90 is located on the exterior wall of the property 84.

Referring now to FIGS. 11 to 14 the kerb or road side box 80 in this construction is placed below footpath 100. The footpath 100 has a suitable removable cover 101 to allow access to the interior 102 of the box 80.

Adjacent the footpath 100 is a kerb 104 and below the kerb 104 is provided an elongated channel member 105. The channel member 105 is divided into a number of conduits to receive services such as water, power, telephone, gas and the like. The embodiment shown shows six such conduits 106.

Below the conduits 106 may be a drain 107. The box 80 may be shaped by providing upper and lower tongues 108, 109 which can clip onto ribs 110, 111 on the channel member 105.

The box 80 may have a pin 115 extending outwardly (preferably downwardly) from the box 80 to provide levelling and support.

The box 80 may have a number of substantially horizontal divider panels 118 to support devices such as connector and/or metering boxes 119.

Thus service are taken from the conduit 106 in which it has, through the wall of the channel 105 and box 80 to a connector within box 80 and then to the appropriate services conduit 81.

The construction described is constructed beside a roadway 120.

The system could also incorporate pulsed meters enabling meter readings to be obtained not only remote from the property or structure but off site and read electronically. Conventional pulsed meters are usually used to read one service e.g. electricity, but the proximity of the pipes/cabling of the system, could, in principle enable a pulsed meter to be developed which could read all three either simultaneously or consecutively at for example the 'flick of a switch'.

Special keys can be required to gain access to both boxes 80 and 90, the key for box 90 could probably be purchased by the property owner but the key to access box 80 would only be available to workers employed by the service providers.

The boxes and the conduits could have free areas or unallocated connections to allow for future proofing in the event of further services becoming available.

Throughout the description and claims of this specification the word "comprise" and variations of that word, such as "comprises" and "comprising", are not intended to exclude other additives, components, integers or steps.

What I claim is:

1. A system for placement of service-providing cables and conduits, comprising:
    an elongated channel member (105), the elongated channel member being elongated in a length direction and longitudinally segmented into a number of receiving conduits (106) elongated in the length direction so that a length of the elongated channel member is greater than a width of the elongated channel member,
    the receiving conduits (106) being arranged in a matrix, as viewed in cross section, with each receiving conduit (106) being separated by wall sections from adjacent receiving conduits (106),
    each receiving conduit configured to receive a selected service-providing cable or conduit such that each of a plurality of service-providing cables or conduits pass along respective ones of the receiving conduits in the length direction within the elongated channel member; and
    a box (80) mountable on the elongated channel member so as to connect the elongated channel member (105) to the box (80), wherein with the box (80) mounted to the elongated channel member (105) the service-providing cables or conduits pass through an exterior wall of the elongated channel member directly into the box,
    wherein the box has a removable cover for access to the interior of the box.

2. A system for placement of service-providing cables and conduits as claimed in claim 1, wherein a further receiving conduit is provided within the elongated channel member to provide drainage.

3. A system for placement of service-providing cables and conduits as claimed in claim 1, wherein the box is configured to clip onto the elongated channel member.

4. A system for placement of service-providing cables and conduits as claimed in claim 3 further including additional receiving conduits extending from the mountable box, mounted to the elongated channel member (105), to a second box positioned remotely from the mountable box, the additional receiving conduits providing one or more channels through which service-providing cables or conduits can pass between the mountable box and the second box.

5. A system for placement of service-providing cables and conduits as claimed in claim 4, wherein the mountable box and the second box provide access points to the service-providing cables or conduits.

6. A system for placement of service-providing cables and conduits as claimed in claim 5, wherein one of the access points is located at or below ground level.

7. A system for placement of service-providing cables and conduits as claimed in claim 5, wherein each access point includes protection against ingress from external elements and living organisms.

8. A system for placement of service-providing cables and conduits as claimed in claim 1, wherein the box is an access box through which the service-providing cables or conduits pass without terminating within the access box.

9. A system for placement of service-providing cables and conduits, comprising:

an elongated channel member (105), the elongated channel member being elongated in a length direction and longitudinally segmented into a number of receiving conduits (106) elongated in the length direction so that a length of the elongated channel member is greater than a width of the elongated channel member, the receiving conduits (106) being arranged in a matrix, as viewed in cross section, with each receiving conduit (106) being separated by wall sections from adjacent receiving conduits (106), each receiving conduit configured to receive a selected service-providing cable or conduit such that each of a plurality of service-providing cables or conduits pass along respective ones of the receiving conduits in the length direction within the elongated channel member; and a box (80) mountable on the elongated channel member so as to connect the elongated channel member (105) to the box (80), wherein with the box (80) mounted to the elongated channel member (105) the service-providing cables or conduits pass through an exterior wall of the elongated channel member directly into the box, wherein the box is an access box through which the service-providing cables or conduits pass without terminating within the access box, and wherein the access box houses plural diverse service-providing cables and conduits including at least two of electric, gas, water, television, and telephone service providing cables or conduits.

10. The system for placement of service-providing cables and conduits, as claimed in claim 9, wherein the access box is hermetically sealable and houses at least one service cut-off device for at least one of the service-providing cables or conduits.

11. A system for placement of service-providing cables and conduits as claimed in claim 9, wherein the access box further houses at least one service cut-off device for at least one of the service-providing cables or conduits.

12. A structure fitted with or connected to the system of claim 1.

13. A system for placement of service-providing cables and conduits, comprising:

an elongated channel member, the elongated channel member being longitudinally segmented into a number of receiving conduits, each receiving conduit configured to receive a selected service-providing cable or conduit, such that the receiving conduits are within the elongated channel member, a box mountable on the elongated channel member so that service-providing cables or conduits pass through a wall of the elongated channel member into the box, and additional receiving conduits extending from the mountable box to a second box positioned remotely from the mountable box, the additional receiving conduits providing one or more channels through which service-providing cables or conduits can pass between the mountable box and the second box.

14. A system for placement of service-providing cables and conduits as claimed in claim 13, wherein the mountable box and the second box provide access points to the service-providing cables or conduits.

15. A system for placement of service-providing cables and conduits as claimed in claim 14, wherein one of the access points is located at or below ground level.

16. A system for placement of service-providing cables and conduits as claimed in claim 14, wherein each access point includes protection against ingress from external elements and living organisms.

* * * * *